United States Patent
Yoon (10) Patent No.: US 11,250,657 B2
(45) Date of Patent: Feb. 15, 2022

(54) POWER PLANT OPERATION HISTORY DEVICE AND METHOD OF MANAGING OPERATION HISTORY OF POWER PLANT USING WEARABLE DEVICE

(71) Applicant: KEPCO ENGINEERING & CONSTRUCTION COMPANY, INC., Gimcheon-si (KR)

(72) Inventor: Chang Sun Yoon, Seoul (KR)

(73) Assignee: KEPCO ENGINEERING & CONSTRUCTION COMPANY, INC., Gyeongsangbuk-do (KR)

(*) Notice: Subject to any disclaimer, the term of this patent is extended or adjusted under 35 U.S.C. 154(b) by 0 days.

(21) Appl. No.: 17/094,439

(22) Filed: Nov. 10, 2020

(65) Prior Publication Data

US 2021/0158643 A1    May 27, 2021

(30) Foreign Application Priority Data

Nov. 26, 2019  (KR) .......................... 10-2019-0153558

(51) Int. Cl.
*G06K 5/00*    (2006.01)
*G07C 9/22*    (2020.01)
(Continued)

(52) U.S. Cl.
CPC .......... *G07C 9/22* (2020.01); *G06K 19/07762* (2013.01); *G06Q 90/00* (2013.01)

(58) Field of Classification Search
CPC ..... G07C 9/22; G06K 19/07762; G06Q 90/00
(Continued)

(56) References Cited

U.S. PATENT DOCUMENTS 9,811,955 B2    11/2017  Russell et al.
10,573,421 B2*   2/2020  Mashio ................. G21C 9/00
(Continued)

FOREIGN PATENT DOCUMENTS

JP    2005-208720    8/2005
JP    2017-521760    8/2017
(Continued)

OTHER PUBLICATIONS

Korean Office Action for Application No. 10-2019-0153558, dated Oct. 21, 2020.
(Continued)

*Primary Examiner* — Ahshik Kim
(74) *Attorney, Agent, or Firm* — Nixon Peabody LLP; Jeffrey L. Costellia (57) ABSTRACT

Provided is a power plant operation history device. The power plant operation history device includes: a communication unit configured to detect RFID of a wearable device and communicate with a signal conversion device; and a control unit configured to determine a power plant control authority of a user based on user identification information obtained through the communication unit, transmit an operation permission signal allowing operation of an input device of a power plant control facility control device to the signal conversion device when it is determined that the user's power plant control authority exists, and normally process a user input from the input device through the signal conversion device.

11 Claims, 9 Drawing Sheets

(51) Int. Cl.
*G06K 19/077* (2006.01)
*G06Q 90/00* (2006.01)

(58) Field of Classification Search
USPC .......................................... 235/380
See application file for complete search history.

(56) References Cited

U.S. PATENT DOCUMENTS

| | | | | |
|---|---|---|---|---|
| 10,831,162 | B2 * | 11/2020 | Tiwari | ............... G06Q 10/0635 |
| 10,984,644 | B1 * | 4/2021 | Alsahlawi | ............... G08B 21/02 |
| 2017/0354370 | A1 * | 12/2017 | Hedin | ................... A61B 5/1118 |
| 2019/0281036 | A1 * | 9/2019 | Eisen | ............... G06Q 20/40145 |
| 2020/0410792 | A1 * | 12/2020 | Romero | ................... G07C 9/30 |

FOREIGN PATENT DOCUMENTS

| | | |
|---|---|---|
| KR | 10-2015-0043050 | 4/2015 |
| KR | 2015-0043050 | 4/2015 |
| KR | 10-1587437 | 1/2016 |
| KR | 10-1587437 B1 | 1/2016 |

OTHER PUBLICATIONS

Korean Office Action for Korean Applicatin No. 10-2019-0153558, dated Oct. 21, 2020.

* cited by examiner

POWER PLANT OPERATION HISTORY DEVICE AND METHOD OF MANAGING OPERATION HISTORY OF POWER PLANT USING WEARABLE DEVICE

CROSS-REFERENCE TO RELATED APPLICATION

This application is based on and claims priority under 35 U.S.C. § 119 to Korean Patent Application No. 10-2019-0153558, filed on Nov. 26, 2019, in the Korean Intellectual Property Office, the disclosure of which is incorporated by reference herein in its entirety.

BACKGROUND

1. Field

An embodiment of the present invention relates to a power plant operation history device and a power plant operation history method for managing an operation history of a power plant using a wearable device.

2. Description of Related Art

A power plant control system is configured to be controllable only by those who have authority to control the power plant facility. In a method of allowing only people with facility control authority to operate, authority is granted to individual IDs and the password appropriate for the ID is entered to log in and then operate only the functions corresponding to the ID's authority, and until now, power plant control systems have maintained security in this way. However, if this method is used when operating an actual power plant, it is a rule that an operator must log out and another operator must log in newly whenever an operator is changed, but other people may operate while the operator is away for a while.

In addition, when a large number of personnel are involved in operations in the control room, such as comprehensive trial operation and planned preventive maintenance (overhaul), there is a possibility that an unauthorized person could secretly or accidentally operate the control facility through a mouse and keyboard in a control facility that is logged in without any security device.

SUMMARY

The present invention is to identify a user with power plant control authority by using a wearable device and to control the power plant facility for the operation action of the user with power plant control authority.

Additional aspects will be set forth in part in the description which follows and, in part, will be apparent from the description, or may be learned by practice of the presented embodiments of the disclosure.

A power plant operation history device according to the embodiments of the present invention includes: a communication unit configured to detect RFID of a wearable device and communicate with a signal conversion device; and a control unit configured to determine a power plant control authority of a user based on user's identification information obtained through the communication unit, transmit an operation permissive signal allowing operation of an input device of a power plant control facility control device to the signal conversion device when it is determined that the user's power plant control authority exists, and normally process a user input from the input device through the signal conversion device.

The communication unit detects a first tag and a second tag of the wearable device, wherein the control unit detects the first tag to determine whether there is a user's operation, detects the second tag to determine whether the user is seated, and determines and processes whether to transmit a user input to the power plant control facility through the power plant control facility control device based on whether there is the user's operation and whether the user is seated.

According to this embodiment, the power plant operation history device further includes a camera configured to photograph the user's operation action, wherein the control unit generates user's operation status information based on an operation action obtained through the camera and the user's operation action on the input device of the power plant control facility control device obtained through the communication unit.

The first tag and the second tag communicate in different frequency bands.

A power plant operation history method according to the embodiments of the present invention includes: detecting, by a communication unit of a power plant operation history device, RFID of a wearable device; determining, by a control unit of the power plant operation history device, a power plant control authority of a user based on a user's identification information obtained from the RFID; transmitting, by the control unit of the power plant operation history device, an operation permissive signal allowing operation on an input device of a power plant control facility control device to a signal conversion device; and transmitting, by the signal conversion device, a user input from the input device to the power plant control facility control device.

According to embodiments of the present invention, the method further includes: determining, by the power plant operation history device, whether there is a user's operation by detecting a first tag of the wearable device; determining, by the power plant operation history device, whether the user is seated by detecting a second tag of the wearable device; and determining and processing whether to transmit user input to the power plant control facility through the power plant control facility control device based on whether there is the user's operation and whether the user is seated.

According to embodiments of the present invention, the method further includes: photographing, by a camera of the power plant operation history device, the user's operation action; and generating, by the power plant operation history device, user's operation status information based on an operation action obtained through the camera and the user's operation action on the input device of the power plant control facility control device obtained through the communication unit.

The first tag and the second tag communicate in different frequency bands.

The computer program according to the embodiment of the present invention may be stored in a medium to execute any one of the power plant operation history method according to the embodiment of the present invention using a computer.

In addition to this, another method for implementing the present invention, another system, and a computer-readable recording medium for recording a computer program for executing the method are further provided.

Other aspects, features, and advantages other than those described above will become apparent from the following drawings, claims, and detailed description of the invention.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Since the present invention can apply various modifications and have various embodiments, specific embodiments are illustrated with reference to the drawings and will be described in detail. Effects and features of the present invention, and a method of achieving them will be apparent with reference to the embodiments described below in detail together with the drawings. However, the present invention is not limited to the embodiments disclosed below and may be implemented in various forms.

In the case of operating a conventional power plant control facility, it is operated by a login method through an ID, and there is a problem in that it is impossible to check an actual user different from the logged in ID.

According to embodiments of the present invention, only a person with a power plant control authority can operate the control facility, and the operation of a person without authority can be fundamentally blocked.

According to embodiments of the present invention, in an environment where the control facility is operated by a plurality of users, such as trial operation and planned preventive maintenance, correspondence relationship between an operator and an operation action can be clearly recorded.

According to embodiments of the present invention, when a serious accident occurs, the illegality of the operator's action can be determined through the correspondence between the operator and the operation action and the timing of the operation action.

According to embodiments of the present invention, as the operator's hand motion is outputted, users can check the power plant control action themselves, and this increases the safety of the power plant control action.

According to embodiments of the present invention, when an operator's change action occurs, since the wearable device is detected, the operator of the operation action can be accurately identified. It is possible to clearly check the action person who controls the power plant without ID login.

According to embodiments of the present invention, when operated by a plurality of users, it is possible to manage operation status or operation history by using the master device of the power plant operation history device that receives signals from a plurality of power plant operation history devices, and the power plant control facility and operation status or operation history can be linked.

According to embodiments of the present invention, detailed authority is given to the power plant control facility, so that even if there is a power plant control authority, it can be managed by an experienced administrator.

Figure 1:
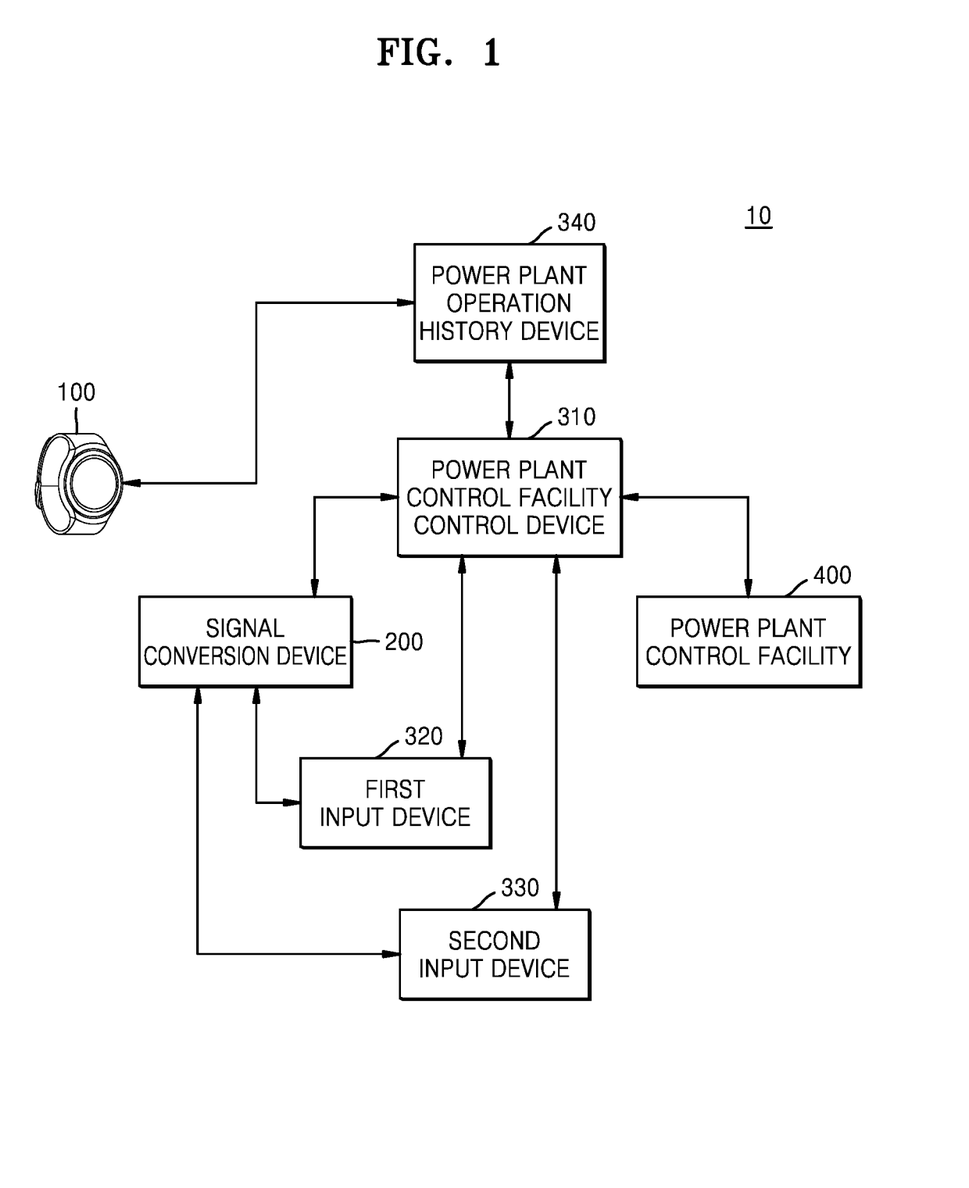
FIG. 1 is a network environment of a power plant control system.

FIG. 1 is a network environment of a power plant control system 10.

The power plant control system 10 includes a wearable device 100, a signal conversion device 200, a power plant control facility control device 310, a first input device 320, a second input device 330, a power plant operation history device 340 and a power plant control facility 400.

The wearable device 100 is a device worn on the user's body, and information on the user may be stored in the wearable device 100. The wearable device 100 may transmit information on a user (identification information, ID, etc.) stored at the request of a communication device. The wearable device 100 may be detected through the power plant operation history device 340, including RFID and tags. The power plant operation history device 340 may detect one or more tags included in the wearable device 100 to indirectly obtain information on a user's location and action. A 900 MHz RFID Tag may be attached to an upper end of the wearable device 100 and a 13.56 MHz RFID Tag may be attached to a lower end of the wearable device 100, but the present invention is not limited thereto.

As shown in FIG. 1, the wearable device 100 may be in the form of a wrist watch, but is not limited thereto, and may be implemented in various forms such as a necklace and a belt.

The power plant control facility control device 310 may transmit a power plant control signal to the power plant control facility 400. The power plant control facility control device 310 may include an input device designed to allow operation through the signal conversion device 200.

The power plant operation history device 340 may request user information from the wearable device 100 and determine the user's authority based on the user information. If it is determined as a user with power plant control authority, the power plant operation history device 340 may transmit a signal allowing operation of the first input device 320 or the second input device 330 to the signal conversion device 200. The operation history check device can be configured in several units, and the presence or absence of an operation related person can be converted into a digital input signal and linked with the power plant main control device.

The operation range of the wearable device 100 and the operation action of the input device may be obtained through the power plant operation history device 340 during the permitted operation time period. The action range of the wearable device 100 may be calculated based on whether a tag included in the wearable device 100 is detected, a detection position of the tag, and the like. The operation action of the first input device 320 or the second input device 330 may be obtained through an image photographed around the input device and/or a communication unit interlocked with the input device. An image photographed around the first input device 320 or the second input device 330 may include a time point at which the user operates the input device and a user input inputted through the input device. The communication unit linked with the first input device 320 or the second input device 330 may detect whether the user's body is within several centimeters (cm) of the input device.

An action range of the wearable device 100 and an operation action of the first input device 320 or the second input device 330 may be outputted through the power plant operation history device 340. The action range of the wearable device 100 and the operation action of the first input device 320 or the second input device 330 may be statistically processed and regenerated. The power plant operation history device 340 communicates with the RFID of the wearable device 100 to determine the user's power plant control authority, and if the user has a power plant control authority, transmits an operation permissive signal that allows the operation of input devices to the signal conversion device 200. Whether there is a power plant control authority can be determined based on the input user information. In this case, the RFID of the wearable device 100 may be recognized through the signal conversion device 200. The power plant operation history device 340 may receive the RFID of the wearable device 100 through the signal conversion device 200.

The signal conversion device 200 transmits operation permissive signals to the first input device 320 or the second input device 330, so that the input signals from the first input device 320 or the second input device 330 are transmitted to the power plant control facility control device 310.

Regarding the operation of users with power plant control authority, the power plant operation history device 340 may generate operation status information including information on a user's action range and user's operation action, and transmit the operation status information to the power plant control facility control device 310.

The power plant control facility control device 310 may generate new operation status information by mutually using operation status information from the power plant operation history device 340 and input signals from the first input device 320 or the second input device 330. The operation status information may include an input time point of actual input signals and an action range and whether there is a match between input time points for operation action.

The power plant control facility control device 310 may transmit a control signal according to an input of a user with a power plant control authority to the power plant control facility 400. At this time, according to the user's power plant control authority, the control signal of the power plant control facility control device 310 may be transmitted to the power plant control facility 400, and the control signal of the power plant control facility control device 310 may not be transmitted to the power plant control facility 400.

Figure 2:
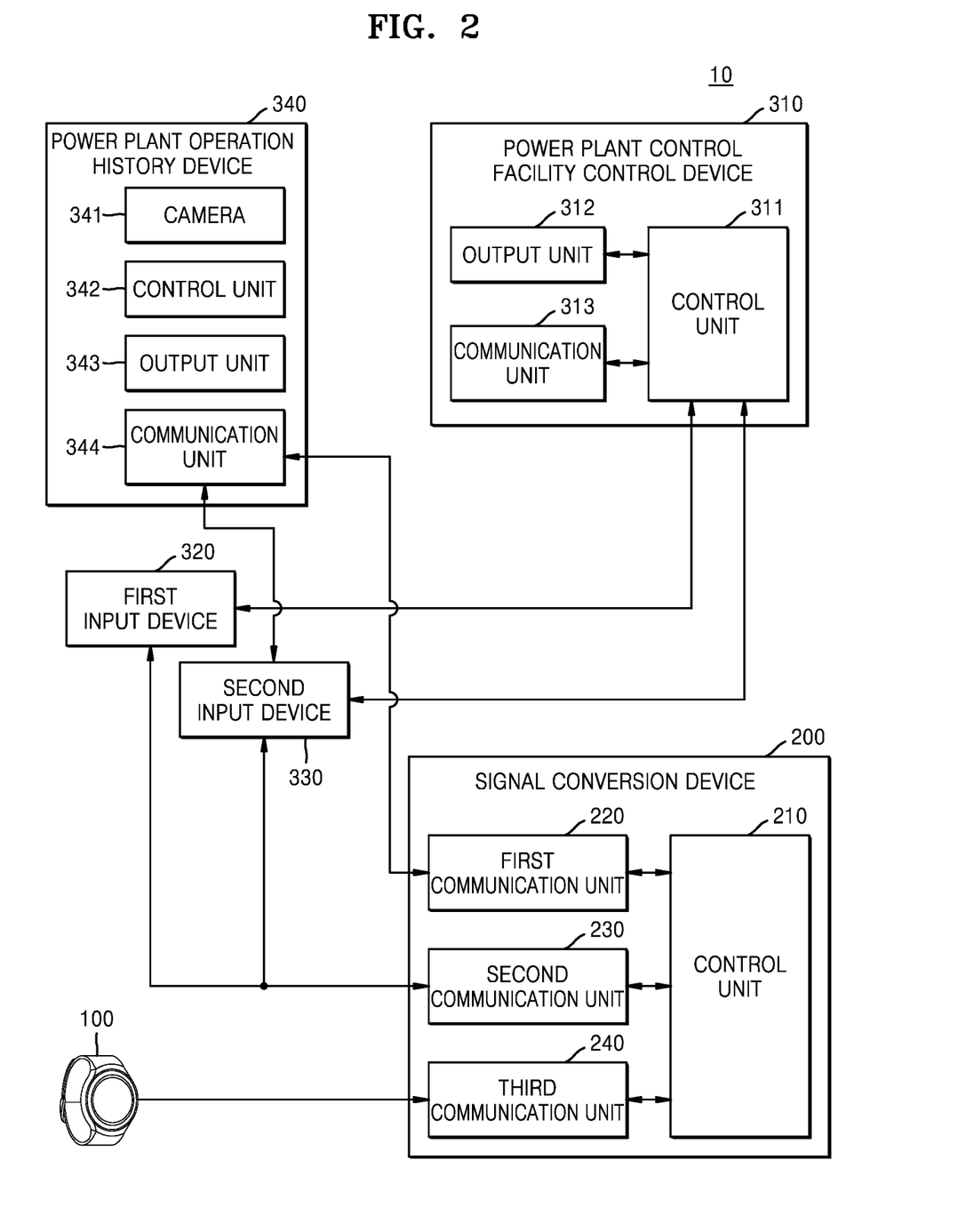
FIG. 2 is a block diagram of a power plant operation history device, a power plant control facility control device, a first input device, a second input device, and a power plant operation history device.

FIG. 2 is a block diagram of a power plant operation history device 200, a power plant control facility control device 310, a first input device 320, a second input device 330, and a power plant operation history device 340.

The wearable device 100 may be detected through the third communication unit 240 of the signal conversion device 200 or the communication unit 344 of the power plant operation history device 340.

The identification information stored in the RFID of the wearable device 100 may be transmitted to the power plant operation history device 340 and may be used to determine the power plant control authority of the user.

If it is determined as a user with power plant control authority, the power plant operation history device 340 may transmit an operation permissive signal to the signal conversion device 200 so that operation of the first input device 320 and/or the second input device 330 is permitted. While the operation is allowed, the signal conversion device 200 obtains a user input through the first input device 320 and/or the second input device 330.

While operation is permitted, the power plant operation history device 340 may detect the first tag and/or the second tag of the wearable device 100. The communication unit 344 of the power plant operation history device 340 may include a first communication means for detecting a first tag and a second communication means for detecting a second tag. The power plant operation history device 340 may additionally include a third communication means for detecting RFID of the wearable device. The power plant operation history device 340 may determine whether the user is seated through the first communication means and determine whether there is a user's operation through the second communication means. In order to determine whether there is a user's operation, the second communication means may be located adjacent to the first input device 320 or the second input device 330.

As long as a user with power plant control authority is detected and user's operation is detected through a second communication means, the power plant operation history device 340 may be implemented to process inputs of the first input device 320 and/or the second input device 330. When a user of the power plant control authority is detected, the power plant operation history device 340 may detect a user's operation through a second communication means and transmit a user input during a predetermined operation permission time section to the power plant control facility control device 310 based on the detected time point. When information on a predetermined operation permission time section is transmitted to the signal conversion device 200, the signal conversion device 200 may transmit user inputs within a corresponding operation permission time section to the power plant control facility control device 310.

The signal conversion device 200 may include a first communication unit 220 that communicates with the communication unit of the power plant operation history device 340 to receive an operation permissive signal and an operation permission time section, a second communication unit 230 that transmits a signal for a user inputted from input devices, and a third communication unit 240 that communicates with a wearable device 100.

The control unit 210 may transmit inputs from the first input device 320 and/or the second input device 330 to the power plant control facility control device 310 through the second communication unit 230.

The power plant operation history device 340 may include a camera 341 that photographs user's operation action, an output unit 343 that outputs operation status information on the user's action range and operation actions of the first input device 320 and/or the second input device 330, and a communication unit 344.

The communication unit 344 of the power plant operation history device 340 may recognize RFID and one or more tags included in the wearable device 100. The communication unit 344 may communicate with the RFID of the wearable device 100 to obtain user identification information.

The control unit 342 of the power plant operation history device 340 may generate actual operation status information of the user in consideration of the operation action obtained through the camera 341 and the user's operation input for the first input device 320 and/or the second input device 330 of the power plant control facility control device 310 obtained through the communication unit 344. The control unit 342 may generate user's operation status information by mutually correlating between the operation action obtained through the camera 341 and the user's operation input for the first input device 320 and/or the second input device 330 of the power plant control facility control device 310 obtained through the communication unit 344. At the time point when the operation input is inputted through the signal conversion device 200, the control unit 342 may determine whether an operation action for an operation input is obtained through a camera, and generate a match between the operation input and the operation action as operation status information. The control unit 342 may generate a power plant control history in which the generated operation status information is associated with the power plant control operation, and may output the power plant control history through the output unit 343. The power plant control history may bundle as one and include the operation action of the camera 342, the input operation of the signal conversion device 200, the power plant control operation, the action time point of the operation action, the input time point of the operation input, the time point of performing power plant control operation, and the like.

The control unit 342 may perform processing to interlock all or part of a power plant control function corresponding to a user's operation action on an input device of the power plant control facility control device 310 in consideration of the user's power plant control authority and operation status information. The user's power plant control authority can be determined by considering the user's department, position, and experience. The power plant control authority can be set in detail for each control function of the power plant. The power plant control function inputted by the user can be interlocked by considering the power plant control authority or operation status information together.

The power plant control facility control device 310 may include a control unit 311, an output unit 312, and a communication unit 313.

The control unit 311 transmits and processes an operation input from the first input device 320 and/or the second input device 330 allowed for operation through the signal conversion device 200 to a power plant control facility.

The control unit 311 may interlock some or all of a power plant control function according to an operation input in consideration of the power plant control authority from the operation history device 340. The control unit 311 may perform processing to interlock all or part of a power plant control function corresponding to a user's operation action on an input device of the power plant control facility control device 310 in consideration of the user's power plant control authority and operation status information. The user's power plant control authority can be determined by considering the user's department, position, and career. The power plant control authority can be set in detail for each control function of the power plant. The power plant control function inputted by the user can be interlocked by considering the power plant control authority or operation status information together.

The control unit 311 may generate actual operation status information of the user in consideration of the operation action obtained through the operation history device 340 and the user's operation input for the first input device 320 and/or the second input device 330. The control unit 311 may generate user's operation status information in mutual relation to the operation action obtained through the operation history device and the user's operation input for the first input device 320 and/or the second input device 330. At the time point when the operation input is inputted, the control unit 311 may determine whether an operation action for an operation input is obtained through a camera, and generate a match between the operation input and the operation action as operation status information. The control unit 311 may generate a power plant control history in which the generated operation status information is associated with the power plant control operation, and may output the power plant control history through the output unit 312. The power plant control history may bundle as one and include the operation action obtained through the operation history device 340, the user's operation input for the input device, the power plant control operation, the action time point of the operation action, the input time point of the operation input, the time point of performing power plant control operation, and the like.

The communication unit 313 may communicate with the operation history device 340 or the signal conversion device 200 to transmit and receive data.

Figure 3:
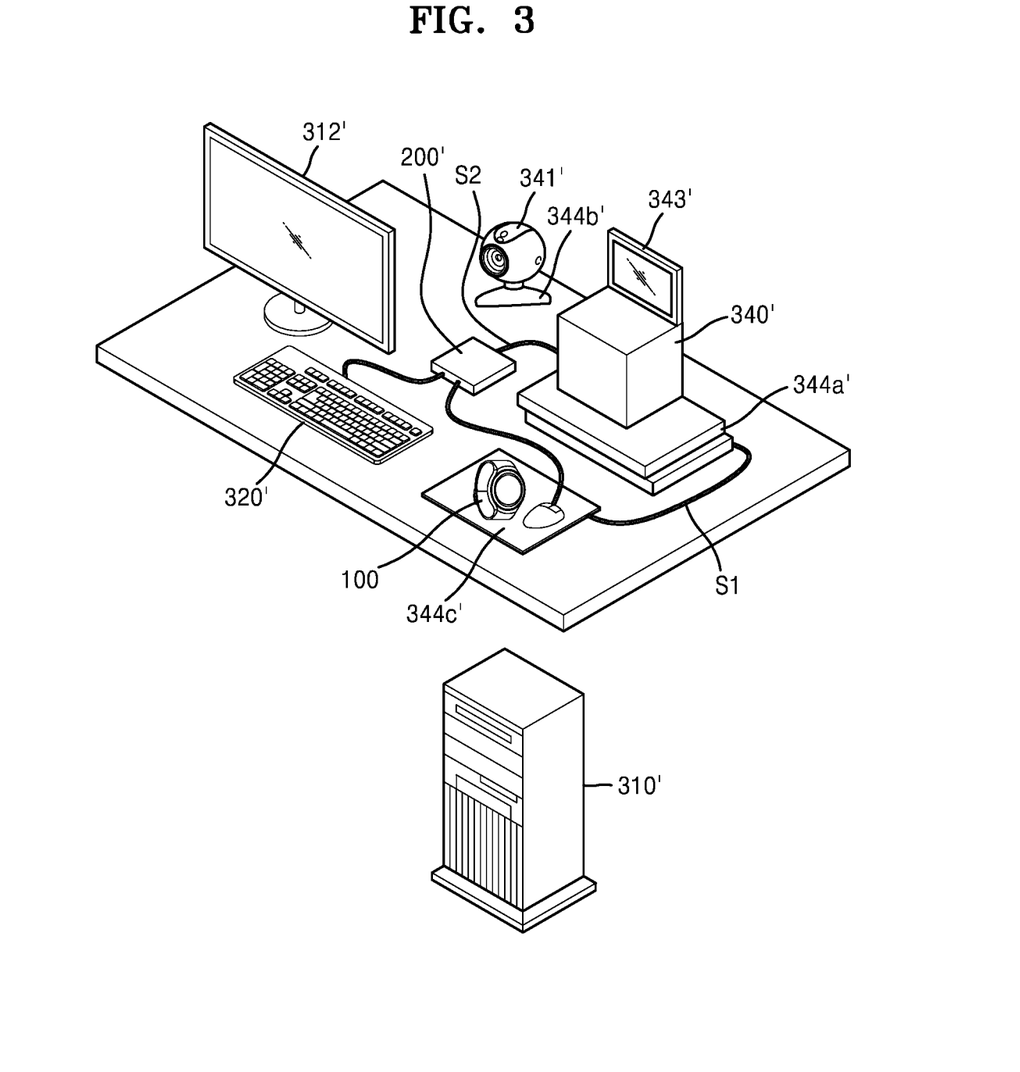
FIG. 3 is an exemplary diagram of a power plant control system according to embodiments of the present invention.

FIG. 3 is an exemplary diagram of a power plant control system 10' according to embodiments of the present invention.

According to this embodiment, the power plant control system 10' can control the authority to use the input device of the power plant control facility using a wearable device 100 equipped with RFID and a microprocessor-based power plant operation history device 340'. The power plant operation history device 340' is a power plant control facility security device that records operation status including who performed which operation at which time point, and may be referred to as a kind of black box.

The power plant control facility control device 310' according to an embodiment of the present invention may be a desktop computing device, and may be operated by input devices such as a keyboard or a mouse. The user input transmitted to the power plant control facility control device 310' is generated by the first input device 320' which is a keyboard and/or the second input device 330' which is a mouse, as shown in FIG. 3.

The power plant operation history device 340' may be a device including a microprocessor-based minicomputer or a Raspberry Pi-based small CPU.

The power plant operation history device 340' may include a camera 341', a control unit 342', an output unit 343', and communication units 344a', 344b', and 344c'. The camera 341', the control unit 342', the output unit 343', and the communication units 344a', 344b' and 344c' may be implemented as separate housings, and at least one of the camera 341', the control unit 342', the output unit 343', and the communication units 344a', 344b', and 344c' may be implemented as an independent housing.

The camera 341', the output unit 343', and the communication units 344a', 344b', and 344c' are electrically connected to the control unit 342' to transmit and receive signals. The control unit 342' may control operations of the camera 341', the output unit 343', and the communication units 344a', 344b', and 344c'.

The communication unit 344a' recognizes identification information, for example, RFID of the wearable device 100 worn by the user. If it is determined that the user has an access authority to the power plant facility through the identification information of the wearable device, the power plant operation history device 340' may transmit an operation permissive signal to the first input device 320' and the second input device 330' through the signal conversion device 200'.

The first input device 320' and the second input device 330' receiving the operation permissive signal may normally process a user input. The first input device 320' and/or the second input device 330' receiving the operation permissive signal may be transmitted to the power plant control facility control device 310'.

The communication units 344b' and 344c' may detect detailed information on a user's operation during an operation allowed time. The communication units 344b' and 344c' may operate in frequency bands having different recognition ranges. For example, the communication unit 344b' may be implemented to operate in a first frequency band having a slightly longer recognition range, and the communication unit 344c' may be implemented to operate in a second frequency band having a slightly shorter recognition range.

The output part 343' of the power plant operation history device 340' may output whether the user's input devices 320' and 330' operate, which is obtained through the communication unit 344c', the operation time point, the input information by operation, whether the user is seated, which is obtained through the communication unit 344b', the seating time point, and the like. The output unit 343' of the power plant operation history device may generate and output user's operation status information through whether the input device is operated and whether the user is seated. The operation status information may further include comparison information with input through the input devices 320' and 330'.

The power plant operation history device 340' may recognize the user's wearable device 100 and determine that the user has a power plant control authority. If it is determined that the recognized user has a power plant control authority, the power plant operation history device 340' transmits a control electrical signal to the signal conversion device 200 to allow operation through the first input device 320' and/or the second input device 330'.

When the driving signal for the control facility is inputted through the preset input devices 320' and 330', it is possible to detect whether the corresponding input devices 320' and 330' are operated through a communication unit communicating with the corresponding input device. For example, if the operation signal for the control facility is mainly inputted using a mouse, the communication unit 344c' may be implemented to detect a tag of the wearable device 100 in a frequency band having a frequency characteristic of a recognition range of several centimeters or less. In this case, the communication unit 344c' may be manufactured in the form of a mouse pad or as a part of the table top plate on which the power plant control facility control device is raised. As a frequency band having such a frequency characteristic, there may be 13.56 MHz, and the frequency band may be implemented by a communication unit 344a' receiving a signal of a corresponding frequency. The communication unit 344a' may transmit the received tag information to the power plant operation history device 340' using a wired or wireless method.

In order to detect whether the user is seated, the power plant operation history device 340' may detect another tag of the wearable device 100 in a frequency band having a frequency characteristic of several meters in a recognition range. For example, the power plant operation history device 340' may include a communication unit 344b' that detects a 900 MHz signal having a recognition range of several meters (m) to detect other tags of the wearable device 100. When recognizing the 900 MHz signal detection tag of the wearable device 100, the communication unit 344b' of the power plant operation history device 340' may transmit a signal to the signal conversion device 200 so that the first input device 320' and/or the second input device 330' are operated. That is, the communication unit 344b' of the power plant operation history device 340' may be implemented to process an input of the first input device 320' and/or the second input device 330' while recognizing the 900 MHz signal detection tag of the wearable device 100.

The power plant operation history device 340' may include output units 343 and 343', and may output recognition state information of the first tag and recognition state information of the second tag of the wearable device through the output units 343 and 343'. The recognition state information of the first tag and the recognition state information of the second tag may include information on a time point at which a user, who is an operator, is seated, information on a time when an input device is operated, and the like.

The power plant operation history device 340' may operate a predetermined connection grace time after the first user accesses the power plant control facility control device. That is, the power plant operation history device 340' may allow the operation to be processed by the second user after the connection grace time expires.

Additionally, the operator's hand motion may be photographed through the camera 341' of the power plant operation history device 340'. The camera 341' of the power plant operation history device 340' may photograph a hand motion for the first input device 320' and/or the second input devices 330'. The camera 341' may photograph at various magnifications including a wide-angle lens. As shown in the drawing, the camera 341' may be implemented by being electrically connected to the control unit of the power plant operation history device 340'. The camera 341' may be designed to be able to change its structure to face the first input device 320' or the second input device 330'. Specifically, the camera 341' may be designed to change the direction, position, or height. The shooting range of the camera 341' may be changed by the control unit 342' or a user input. The camera 341' may be changed or switch a direction by the control unit 342' or a user input. In addition, the screen outputted from the power plant control facility control device 310 may be recorded together with a hand motion, and the operator's operation status may be generated using the image of the hand motion and the image of the outputted screen. The operation status of the operator's power plant control facility generated in this way can be used as important analysis data in case of a serious accident of the power plant.

The power plant operation history devices 340 and 340' may verify the operator authority of the user by comparing the tag information received through a receiver with the power plant operator authority and power plant control authority in terms of software. The power plant operation history devices 340 and 340' may be connected through a signal conversion device 200 and a dedicated cable S2 and may control the first input device 320' and the second input device 330' connected to the power plant control facility control device 310'. The power plant operation history device 340' may refer to a computing device including one or more processors.

The signal conversion devices (refer to 200 of FIG. 2 and 200' of FIG. 3) are connected to power plant operation history devices 340 and 340' to receive electrical signals related to the power plant operator authority through hardware components such as RS-232 communication devices, and upon receiving an electrical signal, the ACC 402 or 2CH of the wiring connected to the USB wire of the ACC (S1, S2 of FIG. 3) keyboard and mouse of the cable connected to the first input device 320' and the cable connected to the second input device 340' is allocated to configure the keyboard and the mouse to operate by connecting Data + and Data −.

The power plant control facility control device 310' may check the power plant control authority of the first input device 320' and/or the second input device 330' to receive input signals from the first input device 320' and/or the second input device 330' with the power plant control authority. In the power plant control facility control device 310', when receiving a control signal for the first input device 320' and/or the second input device 330' using the ACC, during the grace period of a predetermined time (e.g., 20 seconds) after the power plant control authority signal for the first input device 320' or the second input device 330' disappears, there may be a problem that an input signal from the first input device 320' and/or the second input device 330' is not received.

In another embodiment, the power plant control facility control device 310' may use signals from the first input device 320' and/or the second input device 330' as control signals of Data + and Data −.

Figure 6:
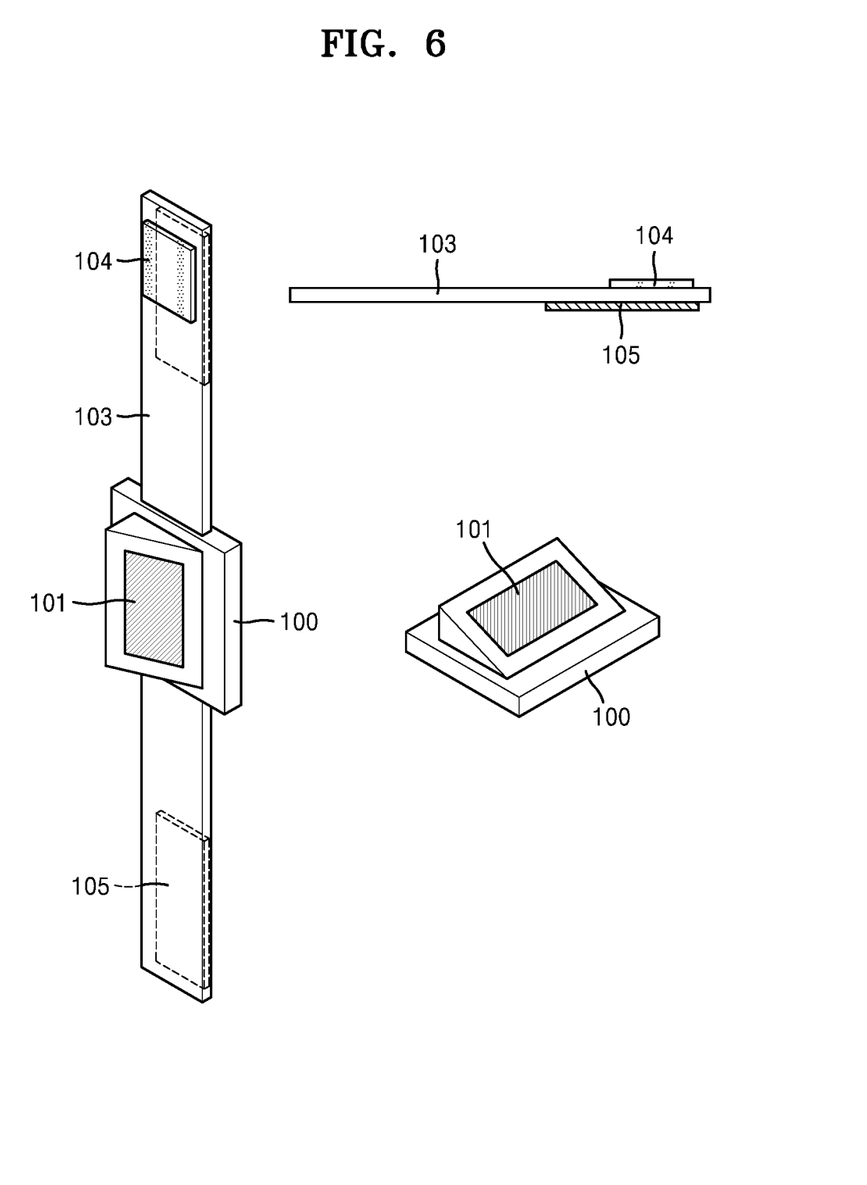
FIG. 6 is a detailed diagram of a wearable device.

In order to fundamentally prevent this problem, if Data + and Data − are used as control signals, the connection of the keyboard and mouse does not occur separately (refer to FIG. 6).

Figure 4:
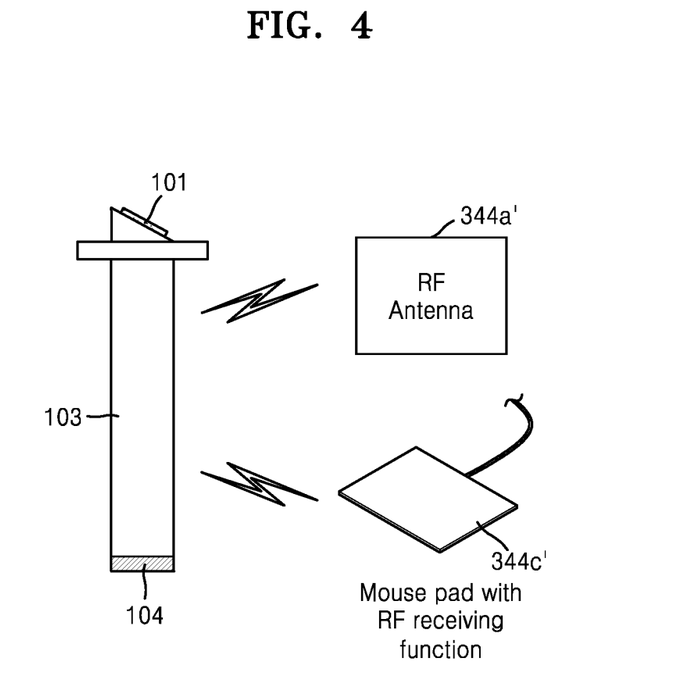
FIG. 4 is a diagram illustrating a process of recognizing the wearable device of FIG. 1.

FIG. 4 is a diagram illustrating a process of recognizing the wearable device 100 of FIG. 1.

The wearable device 100 may include a first tag 101 and a second tag 104. The second tag 104 operating in the second frequency band (e.g., 13.56 MHz band) may be designed to be recognized by a communication unit that checks whether the first or second input device is operated. The communication unit that checks whether the first or second input device is operated may be located adjacent to the first or second input device.

The first tag 101 operating in the first frequency band (e.g., 900 MHz band) may be designed to be recognized by a communication unit that checks whether an operator is seated. A communication unit that checks whether the operator is seated may be located near the operator's seat.

Figure 5:
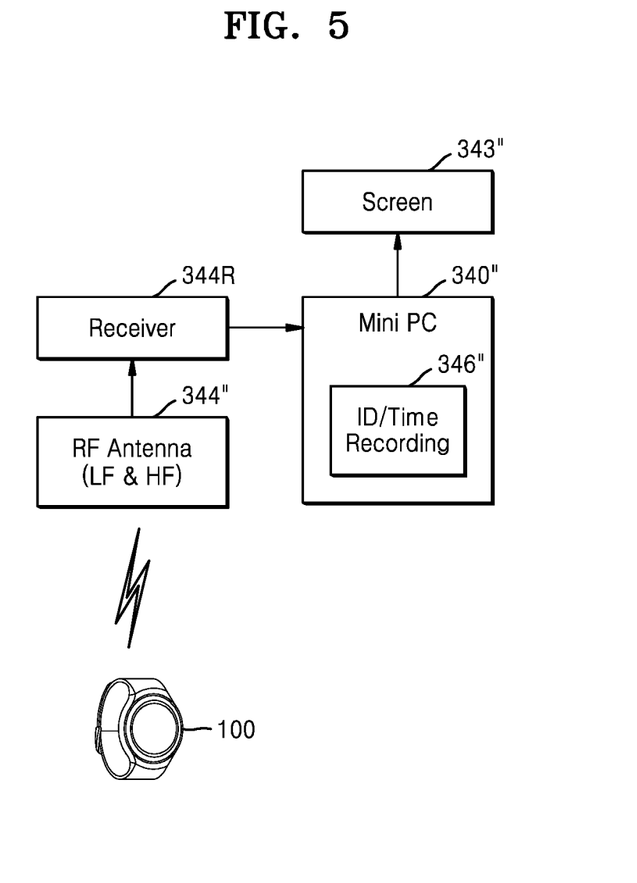
FIG. 5 is a diagram illustrating a process by which a user's operation status information is recorded by a power plant operation history device.

FIG. 5 is a diagram illustrating a process of recording user's operation status information by a power plant operation history device.

The power plant operation history device 340" may include a receiver 344R that recognizes the RFID of the wearable device 100. The receiver 344" may obtain a signal for recognizing the wearable device 100 through the communication unit 344". The obtained information may be transmitted to the control unit of the power plant operation history device 340" and converted into user's operation status information. The user's operation status information may be outputted through the output unit 343". Here, the operation status information may include information on a time point at which the user operates the first input device and information on a time point at which the user operates the second input device.

The communication unit 344" may include a plurality of antennas located at various points and having various frequency characteristics. A wearable device can be recognized at the first point by the first antenna. A wearable device can be recognized at the second point by the second antenna. The information obtained by the first antenna indicates whether the input device is operated, and is located at a point where it is possible to check whether the input device is operated. In addition, the first antenna may be operated in a frequency band having a recognition range (e.g., about several cm) in which operation of the input device can be checked.

The information obtained by the second antenna indicates whether the user is seated, and is located at a point where it is possible to check whether the user is seated. In addition, the second antenna may be operated in a frequency band having a recognition range (e.g., about several m) in which the user is seated.

The power plant operation history device 340" may further include a history generator 346" that generates user's operation status information. The history generator 346" may record information on the user's ID and operation time.

FIG. 6 is a detailed diagram of a wearable device 100.

As shown in FIG. 6, the wearable device 100 may be implemented in a form that can be worn on a user's body. A first tag 101 operating in a first frequency band (900 MHz band) may be provided on a first side of the wearable device 100, and a second tag 104 operating in a second frequency band (13.56 MHz band) may be provided on a second side.

The wearable device 100 may include a band 103 and be attached to the user's body. The band 103 is implemented with a material that can be changed in length, and the length of the band 103 may be changed according to the circumference of the user's wrist, ankle, neck, and the like. A necklace-type wearable device 100 is also possible.

The wearable device 100 may be implemented in the form of a wrist watch and may be adjusted in length according to the thickness of the user's wrist using the Velcro 105, and may be configured to be in close contact with the user's skin. The wearable device 100 may be made of a material having a sense of weight and configured not to rotate on the user's wrist.

User identification information is stored in the first tag 101 or the second tag 102 of the wearable device 100, and the stored information may be transmitted by a request from the power plant operation history device 340 in FIG. 2 or 340' in FIG. 3. The receiver 344 in FIG. 2 or 344' in FIG. 3 of the power plant operation history device 340 in FIG. 2 or 340' in FIG. 3 may receive tag information from the wearable device 100 or 100'.

Unlike the existing method of using the control facility within the power plant by entering the ID and password into the power plant control facility control device, the user can access the control facility in the power plant through the wearable device 100 implemented in the form of a wrist watch. The power plant control facility control device 310 may grant an authority to control the power plant control facility by recognizing the wearable device 100 of a user with an authority.

As described above, the wearable device 100 may be implemented to include a first tag detected in a first frequency band having different frequency characteristics and a second tag detected in a second frequency band. In particular, the wearable device 100 may detect whether the user's input device is operated through the first tag 101 and detect whether the user is seated through the second tag 104.

Figure 7:
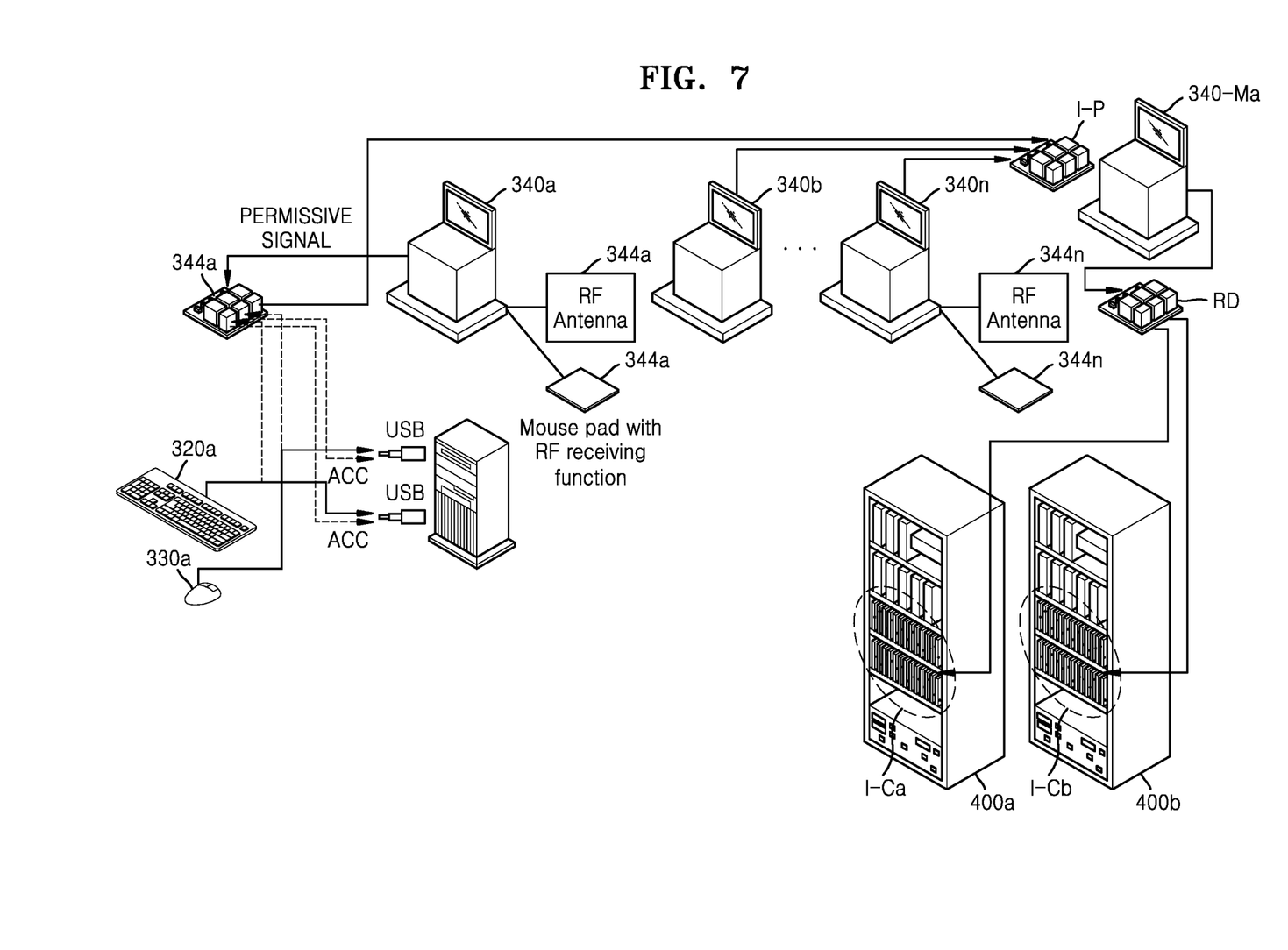
FIGS. 7 and 8 are exemplary diagrams of an embodiment implemented through a plurality of power plant operation history devices.
Figure 8:
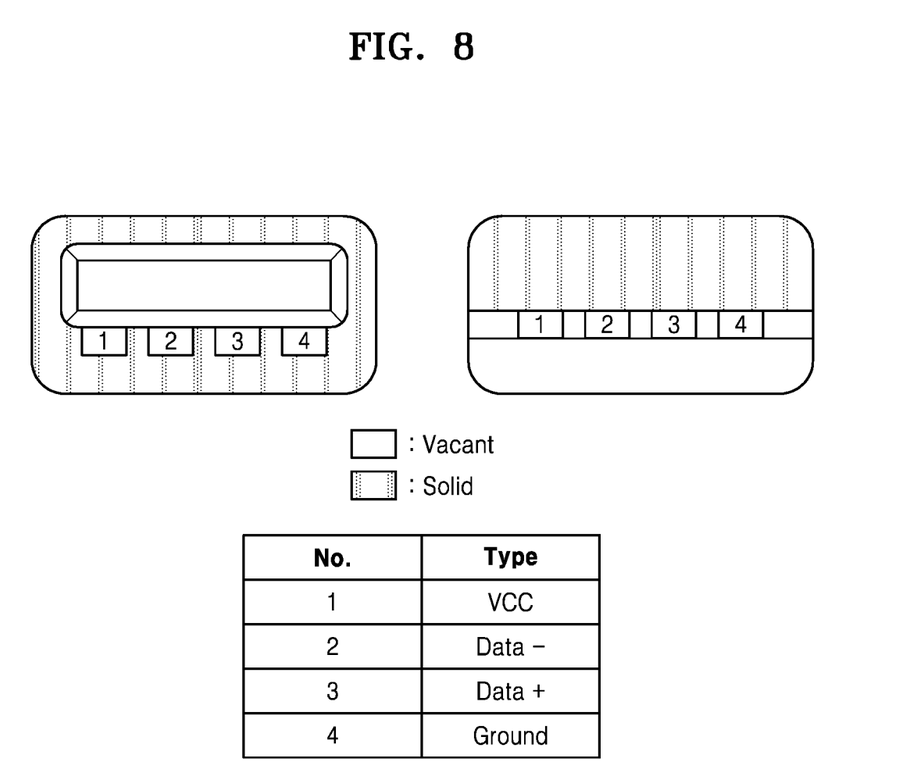

FIGS. 7 and 8 are exemplary diagrams for an embodiment implemented through a plurality of power plant operation history devices.

Referring to FIGS. 7 and 8, signals generated from each power plant operation history device may be transmitted to an input port I-P of a master device 340-Ma of a power plant operation history device through a wired or wireless communication method. The master device 340-Ma of the power plant operation history device may be managed by arranging the signals of each power plant operation history device in an order such as time order or operation order. The signals of each power plant operation history device may be converted into an authority signal through the master device 340-Ma of the power plant operation history device and transmitted to the power plant control facility 400a, or 400b.

The master device 340-Ma of the power plant operation history device is a device configured to collect authority signals to one operation history check device and converts the operation authority permission into a digital input signal and interlocks the digital input signal with the power plant main control device so that this is configured to be used as a facility control that can only be operated by a specific person, or as a function such as limiting automatic operation in the absence of a specific person.

As shown in FIG. 7, the power plant control system 10 or 10' may be implemented including a plurality of power plant operation history devices 340a, 340b, . . . , and the plurality of power plant operation history devices 340a, 340b, . . . , 340n may be interlocked with the master device 340-Ma of the power plant operation history device. A plurality of power plant operation history devices can manage operation history and operation status information of a plurality of operators.

Each of the power plant operation history devices 340a, 340b, . . . , 340n may individually include an interlocked signal conversion device. Each power plant operation history device may transmit an operation permissive signal to the input devices 320a and 330a connected to the power plant control facility control device through a corresponding signal conversion device. Each power plant operation history device may individually include a communication unit 344a for transmitting a signal to a signal conversion device.

In the relay device R interlocked with the power plant operation history devices 340a, 340b, . . . , 340n, operation permissive signals transmitted to input devices may be duplicated and generated.

The signal generated by each power plant operation history device may be transmitted to the master device 340-Ma through an input port I-P of the master device 340-Ma of the power plant operation history device through an electric line such as a cable. The input port I-P may be implemented as shown in FIG. 8, and may include ports corresponding to power plant operation history devices.

The master device 340-Ma of the power plant operation history device may convert the signal to an authority control signal for the power plant control system through another relay device RD and may transmit a signal interlocked with the authority control signal to the input card I-Ca or I-Cb of the corresponding power plant control facility. The signal interlocked with the authority control signal can be processed by the processor of the power plant control facility 400a or 400b, and can be used as a power plant facility control permissive signal.

Figure 9:
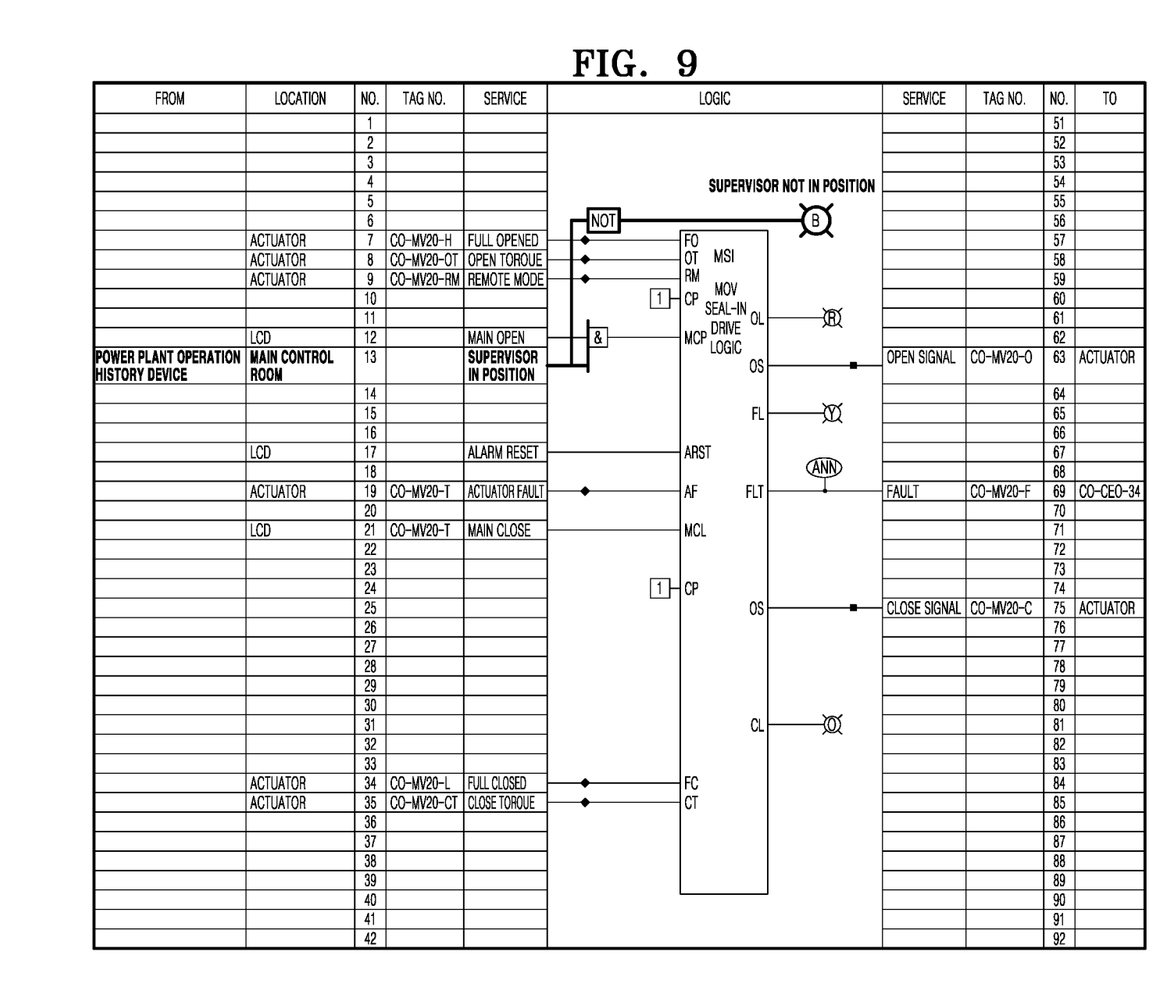
FIG. 9 is an exemplary diagram of parameter information applied to a power plant facility.

FIG. 9 is an exemplary diagram of parameter information applied to a power plant facility.

Referring to FIG. 9, power plant facilities can be driven by a detailed authority. For example, in the power plant facility, in the case of a specific pump, the specific pump can only be operated by a user with authority for the corresponding pump, and can only be operated manually by a user with authority. In the case where a user who is not familiar with the operation of the control facility, such as a new employee, operates the control facility, if a supervisor other than the user is located near the power plant operation history device being operated by a user unfamiliar with the operation, inputs of a user unfamiliar with operation can be processed to be effectively transmitted to the power plant facility. In other words, a user's operation signal unfamiliar with operation may or may not be transmitted to the power plant control facility control device depending on the location of the supervisor. For example, if the supervisor's location is recognized as near the power plant control facility control device, user's operation signal unfamiliar with operation may be transmitted to the power plant control facility control device, and if not, may not be transmitted to the power plant control facility control device.

In addition, when the power plant control room is distributed in a plurality of places, the master device 340-Ma of the power plant operation history device may generate information on the operator of each power plant control room.

The device described above may be implemented as a hardware component, a software component, and/or a combination of a hardware component and a software component. For example, the devices and components described in the embodiments may be implemented using one or more general purpose computers or special purpose computers, for example, a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may execute an operating system (OS) and one or more software applications executed on the OS. In addition, the processing device may access, store, operate, process, and generate data in response to the execution of software. For the convenience of understanding, in some cases, one processing device is described as being used, but those of ordinary skill in the art will appreciate that the processing device may include a plurality of processing elements and/or multiple types of processing elements. For example, the processing device may include a plurality of processors or one processor and one controller. In addition, other processing configurations are possible, such as a parallel processor.

The software may include a computer program, code, instruction, or a combination of one or more of these, and may configure the processing device to operate as desired, or may command the processing device independently or collectively. In order to be interpreted by the processing device or to provide commands or data to the processing device, software and/or data may be permanently or temporarily embodied in any type of machine, component, physical device, virtual equipment, computer storage medium or device, or signal wave to be transmitted. The software may be distributed over networked computer systems and stored or executed in a distributed manner. Software and data may be stored on one or more computer-readable recording media.

The method according to the embodiment may be implemented in the form of program instructions that can be executed through various computer means and recorded in a computer-readable medium. The computer-readable medium may include program instructions, data files, data structures, and the like alone or in combination. The program instructions recorded on the medium may be specially designed and configured for the embodiment, or may be known to and usable by those skilled in computer software. Examples of computer-readable recording media include hardware devices specially configured to store and execute program instructions, for example, magnetic media such as hard disks, floppy disks and magnetic tapes, optical media such as CD-ROM and DVD, magneto-optical media such as a floptical disk, and ROM, RAM, flash memory, etc. Examples of the program instructions include not only machine language codes such as those produced by a compiler, but also high-level language codes that can be executed by a computer using an interpreter or the like. The hardware device described above may be configured to operate as one or more software modules to perform the operation of the embodiment, and vice versa.

According to embodiments of the present invention, a user of a power plant control authority can be identified using a wearable device and a power plant facility can be controlled for an operation action of a user having the power plant control authority.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A power plant operation history device comprising:
   a communication unit configured to detect RFID of a wearable device and communicate with a signal conversion device;
   a camera configured to photograph the user's operation action, and
   a control unit configured to determine a power plant control authority of a user based on a user's identification information obtained through the communication unit, transmit an operation permission signal allowing operation of an input device of a power plant control facility control device to the signal conversion device when it is determined that the user's power plant control authority exists, and normally process a user input from the input device through the signal conversion device,
   wherein the control unit generates user operation status information based on an operation action obtained through the camera and the user's operation action on the input device of the power plant control facility control device obtained through the communication unit.

2. The power plant operation history device of claim 1, wherein the communication unit
   detects a first tag and a second tag of the wearable device, wherein the control unit detects the first tag to determine whether there is an operation performed by the user, detects the second tag to determine whether the user is seated, and determines and processes whether to transmit a user input to the power plant control facility through the power plant control facility control device based on whether there is an operation performed by the user and whether the user is seated.

3. The power plant operation history device of claim 2, wherein the first tag and the second tag communicate in different frequency bands.

4. The power plant operation history device of claim 1, wherein the control unit generates a power plant control history that associates the operation status information with a power plant control operation in a power plant control facility, and controls to output the power plant control history through an output unit.

5. The power plant operation history device of claim 1, wherein the control unit processes to interlock all or part of a power plant control function corresponding to the user's operation action on the input device of the power plant control facility control device, in consideration of the user's power plant control authority and the operation status information.

6. A method of managing an operation history of a power plant, the method comprising:
   detecting of RFID of a wearable device by a communication unit of a power plant operation history device;
   determination of a power plant control authority of a user by a control unit of the power plant operation history device, based on a user's identification information obtained from the RFID;
   transmission of an operation permission signal by the control unit of the power plant operation history device to a signal conversion device, the operation permission signal allowing operation of an input device of a power plant control facility control device;
   transmission, by the signal conversion device, of a user input from the input device to the power plant control facility control device;
   photographing, by a camera of the power plant operation history device, the user's operation action; and
   generating, by the power plant operation history device, of user operation status information based on an operation action obtained through the camera and the user's operation action performed on the input device of the power plant control facility control device obtained through the communication unit.

7. The method of claim 6, further comprising:
   determination, by the power plant operation history device, of whether there is an operation performed by a user, by detecting a first tag of the wearable device;
   determination, by the power plant operation history device, of whether the user is seated, by detecting a second tag of the wearable device; and
   determining and processing whether to transmit a user input to the power plant control facility through the power plant control facility control device, based on whether there is an operation performed by the user and whether the user is seated.

8. The method of claim 7, wherein the first tag and the second tag communicate in different frequency bands.

9. The method of claim 6, further comprising generating, by the power plant operation history device, of a power plant control history that associates the operation status information with a power plant control operation in a power plant control facility, and controlling to output the power plant control history through an output unit.

10. The method of claim 6, further comprising processing, by the power plant operation history device, to interlock all or part of a power plant control function corresponding to the user's operation action on the input device of the power plant control facility control device, in consideration of the user's power plant control authority and the operation status information.

11. A non-transitory computer readable medium having a computer program stored therein which causes a computer to perform processes comprising:
   detecting of RFID of a wearable device by a communication unit of a power plant operation history device,
   determination of a power plant control authority of a user by a control unit of the power plant operation history device, based on a user's identification information obtained from the RFID;
   transmission of an operation permission signal by the control unit of the power plant operation history device to a signal conversion device, the operation permission signal allowing operation of an input device of a power plant control facility control device;
   transmission, by the signal conversion device, of a user input from the input device to the power plant control facility control device;
   photographing, by a camera of the power plant operation history device, the user's operation action; and
   generating, by the power plant operation history device, of user operation status information based on an operation action obtained through the camera and the user's operation action performed on the input device of the power plant control facility control device obtained through the communication unit.

* * * * *